Patented Apr. 28, 1953

2,636,845

UNITED STATES PATENT OFFICE 2,636,845

REACTIVATION OF CONVERSION CATALYSTS

Roger W. Richardson, Julius P. Bilisoly, and Marnell A. Segura, Baton Rouge, La., assignors to Standard Oil Development Company, a corporation of Delaware No Drawing. Application September 8, 1949, Serial No. 114,684

7 Claims. (Cl. 196—52)

This invention relates to processes for the conversion of hydrocarbons and, more particularly, relates to processes for reactivating or revivifying conversion catalysts which have undergone degradation or loss of selectivity after prolonged use or for maintaining catalyst activity or selectivity during use.

Processes for the catalytic conversion or cracking of hydrocarbons are well known. In these processes liquid hydrocarbons, such as gas oil, naphtha, reduced crude, whole crude, or the like, are contacted with active conversion or cracking catalysts at temperatures of from about 750° F. to 1100° F. for a period to give the desired conversion. These processes may utilize the catalyst in the form of a fixed bed, moving bed, or powdered or microspherical catalyst using the fluid technique. Also, catalysts may be used in suspensoid cracking and other related processes. High boiling hydrocarbons such as gas oil are catalytically cracked to produce lower boiling hydrocarbons such as gasoline for example.

During hydrocarbon conversion or cracking, there is deposition of coke or carbonaceous material on the catalyst and the catalyst is periodically regenerated by burning off the coke or carbonaceous material with air or other oxygen-containing gas. Other methods of regeneration may be used. The temperature during regeneration is preferably maintained between about 850° F. and 1150° F., higher temperatures usually being avoided in order to prevent deactivation of the catalyst by overheating. After prolonged or extended use, during which time the catalyst is used for conversion or cracking and is then regenerated, the catalyst loses activity and selectivity and, because of this, the catalyst does not work as efficiently as it does when it is fresh or when it is first put in the unit.

The loss in activity and selectivity shows up when less of the oil feed stock is converted to desirable products, such as gasoline in catalytic cracking, and more coke and more gas are formed than when the catalyst is fresh. This condition indicates that some of the oil feed is lost by being converted to undesirable products. The product distribution characteristics of such a catalyst are poor.

The activity of the catalyst is indicated by the amount of gas oil feed converted to other products and is designated as conversion on the basis of a standardized laboratory test. This test has been described in the chemical literature (Conn, M. E., and Connolly, G. C., Ind. Eng. Chem., 39, p. 1138, September 1947) and is carried on in a fixed-bed unit employing 200 cc. of pilled catalyst. The catalyst bed is in a reaction tube maintained at about 850° F. and the oil to be cracked (East Texas light gas oil in this case) is passed through this bed at a rate of 120 cc./hr. The cycle requires two hours during which 240 cc. of oil are cracked. In the cracking operation, gases and coke are formed, as well as normally liquid hydrocarbons, with the coke being deposited on the catalyst. The cracked liquid product is examined for gasoline content in the ASTM D–86–46 distillation apparatus. The amount of gasoline distilled from a 100 cc. charge of the cracked liquid product at a vapor temperature of 400° F. is designated as distillate or D. The residual portion left in the flask is measured and may be designated as R. The loss, or L, is determined by adding D and R and subtracting this total from 100. The sum of $D+L$, or distillate plus loss, is another criterion of activity and selectivity since it shows the yield of desirable product such as gasoline produced.

The measure of cracking or conversion is obtained by subtracting the percentage of gas oil residual material (R) based on feed from 100. In addition to conversion and $D+L$, the selectivity of the catalyst can be measured by the relative gas and carbon production, that is, the amounts of these undesirable products formed with the catalyst undergoing tests as compared to the quantities formed with a standard uncontaminated catalyst at the same conversion level. The relative gas production factor is designated as RGF and the relative gas is based on the volumetric gas yields, i. e., cu. ft./bbl. of feed. The relative carbon production factor is designated as RCF. Experience has shown that the relative gas and carbon production factors determined from fixed-bed laboratory unit tests are indicative of the amount of gas and carbon formed in commercial fluid catalyst cracking plants.

The quantitative range of these factors varies from about 53% conversion, 50 $D+L$ and 1.0 relative carbon factor and 1.0 relative gas factor for fresh, uncontaminated catalysts to about 22% conversion and 20 $D+L$ or lower; and 1.5 to 2.0 or higher for relative carbon factor and 1.5 to 2.0 or higher for relative gas factor for equilibrium used catalysts from fluid units.

Equilibrium catalyst in a fluid unit is generally described as follows. The fresh catalyst when it is first put into the reactor in a cracking unit has a relatively high activity and after being in the cracking unit for some time this activity drops off rapidly. Equilibrium catalyst is catalyst which has been in the unit for an extended period of time and which is being maintained at substantially constant activity and selectivity by the addition of fresh makeup catalyst.

In the conversion or cracking of hydrocarbons where coke or carbonaceous material is deposited on the catalyst, the coke is removed by burning or some other means and this is generally referred to in the art as a regeneration of the catalyst and the catalyst is then used for further catalytic conversion of hydrocarbons. In the present case, the treatment of the catalyst is referred to as a reactivation or revivification and is independent of or distinct from the regeneration to the extent that it has a different effect upon the catalyst and partially restores the activity and selectivity of the catalyst.

During operation of conversion or cracking processes, especially in the fluid process where powdered catalyst or microspherical catalyst is circulated through the unit, the catalyst apparently becomes contaminated with metal or metal compounds from the equipment such as iron, nickel, etc., and these contaminants reduce the activity of the catalyst and also cause the catalyst to produce more gas and coke than a fresh or uncontaminated catalyst. Also some of the contamination may come from the hydrocarbon feed stock. By reducing the gas and carbon make attributable to the contaminants during conversion or cracking, a greater yield of useful products such as gasoline is achieved, and undesirable products such as gas and carbon are reduced. This not only results in considerable financial benefits because of the increased yield of valuable products, but also is a conservation measure because less valuable feed stock is wasted by being converted to undesirable gas and coke.

Different treatments have been used previously for reactivating conversion catalysts but these have included removing used catalysts from the units and treating the catalyst as a batch outside the cracking or conversion unit, whereas the present process in the preferred form is concerned with treating the catalyst in the unit without interrupting the operation of the conversion process. Reactivating or revivifying the catalyst in the unit has the great advantage that it can be carried on continuously or at very frequent intervals without interrupting or upsetting the operation of the conversion unit. In this manner, both the activity and product distribution can be continuously maintained at a high level so that the catalyst resembles fresh catalyst in its characteristics rather than equilibrium catalyst which has been degraded by continuous use and the contamination resulting therefrom. In some cases the process may also be applied by treating the catalyst by removing deactivated catalyst from the unit, treating, and subsequently returning it to the unit or the process may be applied to make-up catalyst for the unit.

According to this invention, after a catalyst has been used for a number of conversion operations, such as catalytic cracking, followed by a number of regenerations of the catalyst for burning off the carbon with air or other oxygen-containing gas, the catalyst is reactivated or revivified in the unit without interrupting the operation of the process by treating the catalyst with a fluorine and boron containing material or materials in admixture or in a sequence of steps. This reactivation treatment is carried on during or after regeneration or during stripping following cracking. In the preferred form the treatment is with a fluorine compound such as hydrofluoric acid and a boron compound such as boric acid, but other combinations may be used as will be hereinafter described.

It has now been found that catalyst such as silica-alumina, silica-magnesia, silica-alumina-magnesia, or synthetic gels of the above type or the so-called natural catalysts such as acid treated bentonites and similar catalytic materials that have suffered loss in activity and/or selectivity after a number of alternate conversion or cracking and regeneration operations may have their activity and selectivity restored at least to some extent by treating the spent catalyst with materials containing fluorine and boron. The reactivation or revivification treatment is so carried out to deposit such compounds or mixtures thereof on the catalyst. In the preferred form of the invention a mixture of HF and $H_3BO_3$ is added to the catalyst in the unit by introducing such mixture into the unit.

The revivifying materials may be mixed with the stripping steam after the cracking reaction or they may be mixed with the regeneration air which is used to burn the carbon off of the catalyst. Also these materials may be added with the feed stock being introduced into the reactor or in the fluid process they may be added with the gases used to transport the catalyst as a dilute suspension or less dense suspension through transfer lines from one section of the unit to another. The fluorine containing compound and boron containing compound may be added as a mixture or separately to the cracking unit. Or one of the materials such as boric acid may be added to the catalyst and the catalyst used in a cracking step and then the other material such as HF may be added to the catalyst and the treated catalyst then used in a cracking step. These compounds may be added to the catalyst in the unit as solids, liquids or gases and also solution thereof may be used which are added to the catalyst in the unit as such. The reactivation treatment may be continuous or intermittent, that is, the reactivating compound or compounds may be continuously added to the unit in small amounts or the reactivating compound or compounds may be added to the unit for a while and then the addition stopped and the catalyst used in the unit without any reactivation treatment and then later the reactivation treatment can again be started.

The revivifying substance or substances used to treat a powdered catalyst in a fluid unit may be added with the oil feed so that the revivifying substance will be thoroughly mixed with the dense turbulent dry liquid simulating bed or mass of catalyst in the reactor at a temperature of about 750° F. to 1100° F. If the revivifying substance is added to the regeneration with the regenerating air or separately as a stream in a fluid unit, the substance will be thoroughly mixed with the dense turbulent liquid simulating bed or mass of powdered catalyst in the regeneration and the catalyst will be given a revivification treatment while being regenerated. The temperature during regeneration is about 850° F. to 1150° F.

In fluid units using powdered silica alumina or silica magnesia catalyst, the density of the fluidized catalyst mixture may be between about 15 and 40 pounds per cubic foot and the superficial gas velocity in the reactor and regenerator will be between about 0.5 and 3.0 feet per second. In the standpipes the superficial velocity is usually between about 0.05 and 0.5 foot per second. With denser materials and/or low velocities high densities will be obtained.

In most fluid units the catalyst is withdrawn from the reactor and regenerator as a dense fluidized liquid simulating phase and stripping of the fouled catalyst following a cracking step is preferably done while the catalyst is in the dense fluidized condition. For revivifying the catalyst during stripping the revivifying substance is added to the stripping steam or is separately added as a gaseous stream to treat the fouled catalyst while stripping it or after stripping it. The stripping of the fouled catalyst at a temperature between about 750° F. and 1100° F. can be effected in the upper portion of the standpipe or in a separate stripping vessel where the catalyst being stripped and treated is preferably in a dense fluidized condition having a level like a liquid.

If desired the catalyst may be treated and stripped or treated alone following regeneration in a manner similar to that just described above for the fouled catalyst. Or the regenerated catalyst may be treated with one of the substances such as $H_3BO_3$ or other boron compound in the upper portion of the standpipe used for withdrawing regenerated catalyst from the regenerator and the treated catalyst is then passed to the reactor for a cracking step. Following the cracking step the fouled catalyst is stripped with steam and at the same time revivified with another substance such as anhydrous HF or other fluoride. The treatment of regenerated catalyst is carried out at a temperature of about 850° F. to 1150° F.

The amount of treating compound or compounds used for reactivating or revivifying the catalyst will be in the ratio between about 0.01 part by weight to 10.0 parts by weight of the reactivating material (which may include $x$ parts HF plus $y$ parts $H_3BO_3$ as found to be optimum, but usually will include 3 moles HF to 1 mole $H_3BO_3$, the latter proportion amounting to a weight ratio of 60 parts HF to 61.84 parts $H_3BO_3$) to 100 parts by weight of the catalyst which is to be treated, per 24 hours of operation.

The invention may be used with fluid units where powdered catalyst is used, in moving bed type units where larger catalyst particles are used in the units and in fixed-bed operation where the catalyst remains substantially stationary in the same apparatus during the entire process. In all of these forms of processes the reactivating compound or compounds may be added during or after regeneration, during stripping of the fouled catalyst following conversion, during steam stripping of the regenerated catalyst following regeneration or the reactivated compound or compounds may be added to the feed stock going to the reactor. In addition the reactivating material may be dissolved in a liquid and the liquid introduced into the unit where it is vaporized for treating the catalyst.

In cases where the reactivating or revivifying compound is in the gaseous form, such gas may be introduced at any desirable point in the unit for reactivating or revivifying the catalyst. In addition where the reactivating material is a solid or liquid it may be mixed with the catalyst during the preparation of the catalyst. Or the reactivating material may be added to the make-up catalyst and supplied to the unit in this way. As the make-up catalyst is usually added only at rather extended intervals the concentration of the reactivating material should preferably be greater on the make-up catalyst than in the case where the reactivating material is continuously or substantially continuously added to the unit.

In mixing the reactivating material according to the preferred form of the invention the anhydrous hydrogen fluoride and boric acid are dissolved in water and this solution is vaporized within the unit during the reactivation or revivifying treatment. When these materials are dissolved in water apparently some fluoboric acid is formed in the mixture or solution. In a modification of this process it is possible on the one hand to have an excess of hydrogen fluoride or on the other hand to have an excess of boric acid for use in treating deactivated catalysts.

In another form of the invention, used cracking catalysts have their activity and selectivity improved by treating the used partially deactivated catalyst with a mixture of aluminum fluoride and boric acid. The revivifying treatment may be effected in a number of ways as for example by adding the revivifying material directly to the catalyst in the unit as a mixture of dry material. The catalyst may be removed from the unit and dry mixed with the aluminum fluoride and boric acid or the used catalyst may be impregnated with a solution of aluminum fluoride and boric acid.

In another form of the invention used silica alumina catalyst may be mixed with boric acid and used for cracking oil and this catalyst may then be treated with anhydrous hydrogen fluoride.

In the following Table I there are shown results of treating used catalyst after the regeneration period. This treating was done in the 200 cc. catalyst testing unit previously described. The catalyst used was a used or equilibrium powdered silica-alumina catalyst containing about 12% alumina, which catalyst was taken from a commercial catalytic cracking plant and pilled into cylinders of $\frac{3}{16}''$ by $\frac{3}{16}''$. The feed stock was an East Texas light gas oil which was fed to the unit at a rate of 0.6 v./v./hr. during two-hour cracking cycles at a temperature of 850° F. and during the regeneration the temperature was maintained at 950° F. to 1050° F. After the cracking period the catalyst was stripped with nitrogen for about thirty minutes and was then regenerated with an air-nitrogen mixture at a temperature of 950° F. to 1050° F. After each regeneration cycle a solution containing HF and $H_3BO_3$ in the ratio of 3 moles HF to 1 mole $H_3BO_3$ was passed over the catalyst. Nitrogen (1 cu. ft. per treatment) was used as a carrying gas, the volatilized aqueous part of the solution furnishing steam. About 0.6% by weight based on the catalyst of the mixture of hydrogen fluoride and boric acid was used (the actual ratio was 0.3% by weight HF plus 0.309% by weight $H_3BO_2$) and the steam used in each cycle amounted to 5.7 wt. % of the oil feed. This revivification treatment required one hour and the catalyst was at a temperature of about 850° F. However the temperature may be maintained between about 750° F. and 1150° F. For comparison a catalyst was tested which was not given a revivification treatment. This catalyst was tested only for two cycles since experience has shown that the untreated catalyst does not change appreciably with continued testing.

TABLE I

| Catalyst | Total Treat. Percent on Catalyst | | Cycle No. | Conversion | Percent D+L | RCF | RGF |
|---|---|---|---|---|---|---|---|
| | HF | H₃BO₃ | | | | | |
| Untreated | --- | --- | 1 | --- | 22.0 | --- | 1.96 |
| | --- | --- | 2 | 24.5 | 21.8 | 1.86 | 1.97 |
| Treated with 0.3% by wt. HF and 0.3% by wt. H₃BO₃ per cycle for 5 cycles following regeneration (no treatment after last cycle) | 0.3 | 0.3 | 1 | --- | 21.0 | --- | 2.21 |
| | 0.6 | 0.6 | 2 | --- | 22.0 | --- | 1.75 |
| | 0.9 | 0.9 | 3 | --- | 24.0 | --- | 1.56 |
| | 1.2 | 1.2 | 4 | --- | 26.0 | --- | 1.36 |
| | 1.5 | 1.5 | 5 | --- | 28.5 | --- | 1.25 |
| | | | 6 | 29.7 | 29.0 | 1.01 | 1.09 |

From the above table it will be apparent that the activity of the starting catalyst has been materially improved and also the selectivity identified by the RCF and RGF has also been improved as indicated by the reduction in these numbers. Also in this table it will be seen that the total treatment with the hydrogen fluoride-boric acid mixture amounted to 3.0% by weight of the catalyst. The conversion and the relative carbon factors were determined only in the last cycle of the test since the carbon is obtained by direct measure on the catalyst and this can be accomplished best by analyzing the catalyst after removal from the unit. Accordingly there was no regeneration after the sixth cycle.

In the following example a deactivated silica alumina catalyst containing about 12% alumina was reactivated or revivified and subsequently tested in the same type unit above described in relation to the first example. However, in this case the used catalyst was impregnated with a solution of 1% $B_2O_3$ (using $H_3BO_3$) plus 1% by weight of aluminum fluoride. The aluminum fluoride was prepared by dissolving powdered aluminum metal in aqueous HF solution. The resulting aluminum fluoride solution was mixed with boric acid solution and the mixed clear solution was used at about room temperature for impregnating used or equilibrium catalyst from a commercial fluid unit. The amounts of reagents used were sufficient to deposit on the catalyst about 1% by weight of aluminum fluoride and 1% by weight of $B_2O_3$ of the catalyst.

The treated catalyst was dried, pilled and tested for activity and selectivity in the 200 cc. units along with the untreated catalyst for comparison and the results are shown in Table II:

TABLE II

| Catalyst | Cycle No. | Conversion | Percent D+L | RCF | RGF |
|---|---|---|---|---|---|
| Used Catalyst from Commercial fluid Unit. | 1 | --- | 22.0 | --- | 1.96 |
| | 2 | 24.5 | 21.8 | 1.86 | 1.97 |
| Same Impregnated with 1% AlF₃ Plus 1% B₂O₃ (Using H₃BO₃). | 1 | --- | 26.0 | --- | 1.97 |
| | 2 | 27.1 | 25.5 | 1.01 | 1.74 |

The above results show that treatment with the mixed fluorine and boron containing compounds effected a substantial improvement in the quality of the catalyst which had been contaminated and degraded with use.

In another example, used or equilibrium catalyst composed of silica with about 12% of alumina from a commercial fluid cracking unit was thoroughly dry mixed at about room temperature with $H_3BO_3$ in an amount equivalent to 1% $B_2O_3$, and this dry mixture was subsequently formed into pills and tested in the 200 cc. unit described in connection with the data set forth in Table I. The feed stock and other testing conditions are similar to those described in connection with Table I. After each regeneration cycle the catalyst was treated with 0.3% by weight of HF (in 5% aqueous HF solution) on the catalyst which was passed over the catalyst diluted with about one cubic foot of nitrogen which was used as carrying gas. The steam used in each cycle was derived from the aqueous HF and amounted to 5.7 wt. % of the feed. This treatment after each cycle (except the last) required about one hour. For comparison, a catalyst was tested which was not given in the revivification treatment, the results being given in Table III.

TABLE III

| | Total Treat. Percent on Catalyst | Cycle No. | Conversion | Percent D+L | RCF | RGF |
|---|---|---|---|---|---|---|
| | Percent HF | | | | | |
| Untreated Catalyst | --- | 1 | --- | 22.0 | --- | 1.96 |
| | --- | 2 | 24.5 | 21.8 | 1.86 | 1.97 |
| Same, but Dry Mixed with H₃BO₃ (equivalent to 1% B₂O₃ and then pilled). | 0.0 | 1 | --- | 20.5 | --- | 1.99 |
| | 0.3 | 2 | --- | 21.5 | --- | 1.49 |
| | 0.6 | 3 | --- | 23.0 | --- | 1.30 |
| | 0.9 | 4 | --- | 24.0 | --- | 1.33 |
| | 1.2 | 5 | --- | 25.0 | --- | 1.28 |
| | 1.5 | 6 | 25.3 | 25.0 | 1.04 | 1.14 |

The data obtained show that a very significant improvement in the quality of the catalyst was obtained, particularly in regard to reducing the quantity of undesirable materials formed such as carbon and light gases. This catalyst, of course, had been degraded and contaminated with use in the commercial cracking unit before the revivification treatment.

What is claimed is:

1. A method of reactivating partially deactivated silica-alumina hydrocarbon conversion catalyst containing about 12% of alumina which has been used in a number of conversion operations and regeneration operations which comprises treating the partially deactivated catalyst with a mixture of 3 moles hydrogen fluoride and 1 mole boric acid for a sufficient period of time to reactivate or revivify the catalyst.

2. A method of reactivating partially deactivated silica-alumina cracking catalyst containing about 12% of alumina which comprises treating the catalyst after regeneration with a mixture of hydrogen fluoride and boric acid in a weight ratio of about 60 parts of hydrogen fluoride to about 61.84 parts of boric acid in a combined amount between about 0.01% to 10% by weight of the catalyst per 24 hours.

3. In the process of cracking hydrocarbon oils by contacting the hydrocarbon oils with a silica alumina cracking catalyst containing about 12% of alumina at a temperature of about 750° F. to 1100° F. and periodically regenerating the catalyst by burning off carbonaceous deposits thereon and repeating the contacting and regeneration steps after which the catalyst becomes partially deactivated, the improvement which comprises treating such partially deactivated catalyst after a cracking step with a fluorine-containing compound and a boron containing compound in the ratio of about 3 mols of the fluorine containing compound and about 1 mol of the boron containing compound for reactivating or revivifying the catalyst.

4. In the process of cracking hydrocarbon oils by contacting the hydrocarbon oil with a silica alumina cracking catalyst containing about 12% of alumina and periodically regenerating the catalyst with the catalyst becoming partially deactivated after extended use, the improvement which comprises adding a boron containing compound to the partially deactivated catalyst, using such a treated catalyst for cracking additional oil and then treating the catalyst with hydrogen fluoride at a temperature of about 750° F. to 1150° F. to increase the activity and selectivity of the catalyst without interrupting the operation of the process, the ratio of the boron containing compound and the fluorine containing compound being about 1 mol of the boron containing compound and about 3 mols of the fluorine containing compound.

5. In the process of cracking hydrocarbon oils by contacting the hydrocarbon oil with a silica alumina cracking catalyst containing about 12% of alumina and periodically regenerating the catalyst with the catalyst becoming partially deactivated after extended use the improvement which comprises first adding boric acid to the partially deactivated catalyst, using such a catalyst to crack additional hydrocarbon oil and then treating the boric acid containing catalyst with hydrogen fluoride to increase the activity and selectivity of the catalyst, the boric acid and the hydrogen fluoride in the ratio of about 1 mol of boric acid to about 3 mols of hydrogen fluoride being used in a combined amount between 0.01 to 10% by weight of the catalyst per hour.

6. In the process of cracking hydrocarbon oils by contacting the hydrocarbon oils with a powdered silica alumina cracking catalyst containing about 12% of alumina at a temperature of about 750° F. to 1100° F. and periodically regenerating the catalyst by burning off carbonaceous deposit thereon at a temperature between about 850° F. and 1150° F. and repeating the contacting and regeneration steps after which the catalyst becomes partially deactivated, the improvement which comprises treating such deactivated catalyst with hydrogen fluoride and boric acid in the ratio of about 1 mol of boric acid to about 3 mols of hydrogen fluoride while the powdered catalyst is maintained at operating temperature conditions and in a dense dry fluidized liquid simulating condition.

7. A process according to claim 6 wherein the treating step is carried out in the cracking step or regeneration step.

ROGER W. RICHARDSON.
JULIUS P. BILISOLY.
MARNELL A. SEGURA.

References Cited in the file of this patent

UNITED STATES PATENTS

| Number | Name | Date |
|---|---|---|
| 2,407,914 | Bailey et al. | Sept. 17, 1946 |
| 2,428,741 | Plank | Oct. 7, 1947 |
| 2,430,724 | Meadow | Nov. 11, 1947 |